(12) United States Patent
Sun et al.

(10) Patent No.: US 7,193,797 B1
(45) Date of Patent: Mar. 20, 2007

(54) METHOD AND APPARATUS FOR DETECTING AND MONITORING A BI-STATE HEAD WHEN SELF-SERVOWRITING A DISK DRIVE USING SPIRAL SERVO INFORMATION

(75) Inventors: Yu Sun, Fremont, CA (US); Don Brunnett, Pleasanton, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/102,470

(22) Filed: Apr. 8, 2005

Related U.S. Application Data (60) Provisional application No. 60/560,824, filed on Apr. 8, 2004.

(51) Int. Cl.
*G11B 27/36* (2006.01)
(52) U.S. Cl. ...................................... 360/31
(58) Field of Classification Search ................ 360/31, 360/75, 51, 29, 55, 77.02, 77.07, 77.08
See application file for complete search history.

(56) References Cited

U.S. PATENT DOCUMENTS 5,901,003 A * 5/1999 Chainer et al. ............... 360/51
5,991,115 A * 11/1999 Chainer et al. ............... 360/75
6,943,978 B1 * 9/2005 Lee ............................. 360/75
6,965,489 B1 * 11/2005 Lee et al. ..................... 360/75
6,967,799 B1 * 11/2005 Lee ............................. 360/51
6,985,316 B1 * 1/2006 Liikanen et al. .............. 360/29
6,987,636 B1 * 1/2006 Chue et al. ................... 360/75
6,989,954 B1 * 1/2006 Lee et al. ..................... 360/75
6,992,851 B1 * 1/2006 Cloke .......................... 360/75
6,992,852 B1 * 1/2006 Ying et al. ................... 360/75
7,016,134 B1 * 3/2006 Agarwal et al. .............. 360/51
7,068,459 B1 * 6/2006 Cloke et al. ................. 360/75

* cited by examiner

*Primary Examiner*—Fred F. Tzeng
(74) *Attorney, Agent, or Firm*—Tejpal S. Hansra (57) ABSTRACT

The present invention is directed to a method and apparatus for detecting and monitoring a bi-state head when self-servowriting a disk drive. In one embodiment, an integration window is opened about an expected time that a read head will read spiral servo information. An integration value associated with the integration window is determined. Next, a determination is made as to whether the integration value is less than a predetermined low amplitude limit. If it is, a comparison is made between a location of a maximum sync frame of a read signal envelope in the integration window and the center of the integration window. The read head is identified as a bi-state head if the location of the maximum sync frame is greater than a predetermined off-center limit relative to the location of the center of the integration window.

18 Claims, 10 Drawing Sheets

METHOD AND APPARATUS FOR DETECTING AND MONITORING A BI-STATE HEAD WHEN SELF-SERVOWRITING A DISK DRIVE USING SPIRAL SERVO INFORMATION

CROSS-REFERENCE TO RELATED APPLICATIONS

Priority is claimed from U.S. Provisional Patent Application Ser. No. 60/560,824 filed Apr. 8, 2004, which is incorporated herein by reference in its entirety.

FIELD OF THE INVENTION

The present invention relates generally to data storage devices, such as disk drives. More particularly, the present invention relates to a method and apparatus for detecting and monitoring a bi-state head when performing a self-servo write operation in a disk drive using spiral servo information.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

Figure 1:
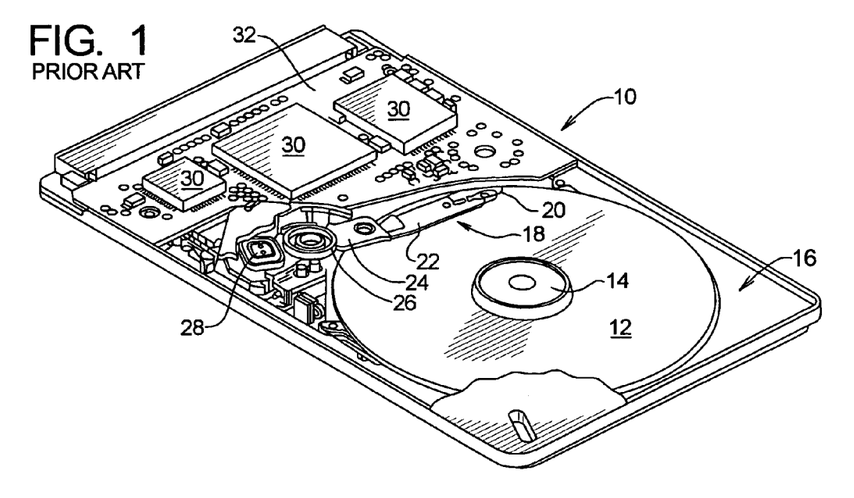
FIG. 1 is a diagrammatic representation illustrating a conventional disk drive with its top cover removed.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Figure 2:
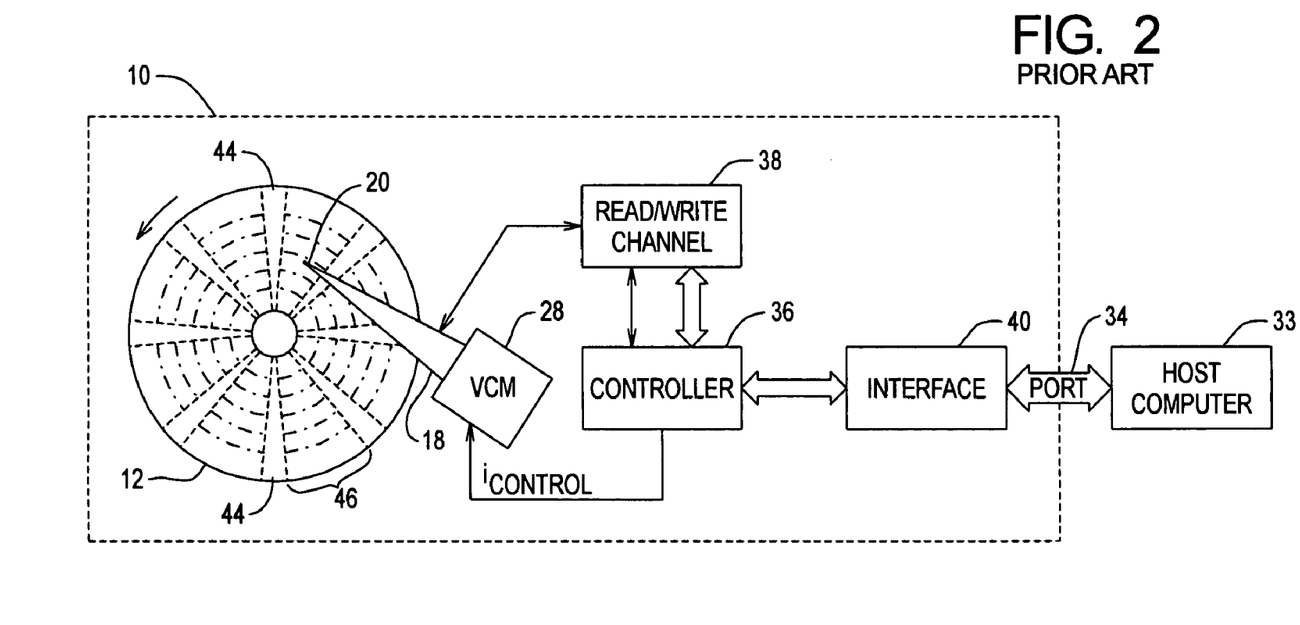
FIG. 2 is a functional block diagram which illustrates a conventional disk drive that is coupled to a host computer via an input/output port.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

Figure 3:
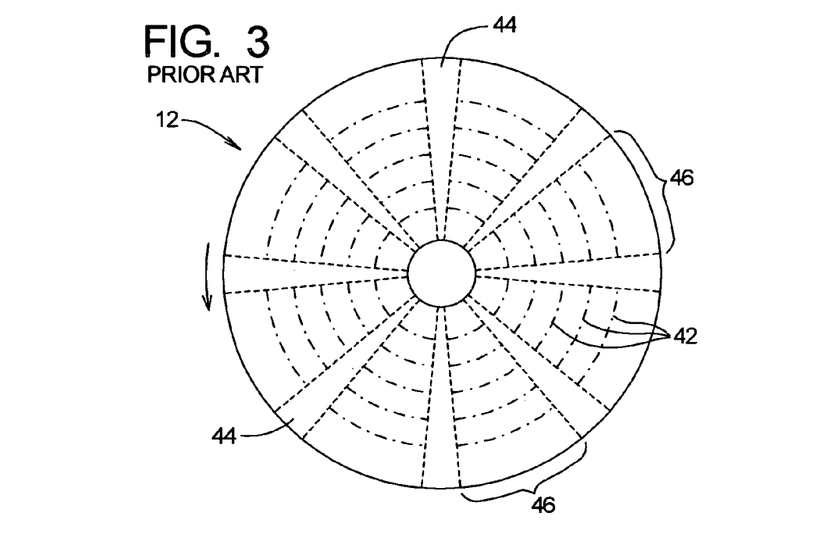
FIG. 3 is a diagrammatic representation of a top view of a magnetic storage disk illustrating a typical organization of data on a disk surface.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

Figure 4:
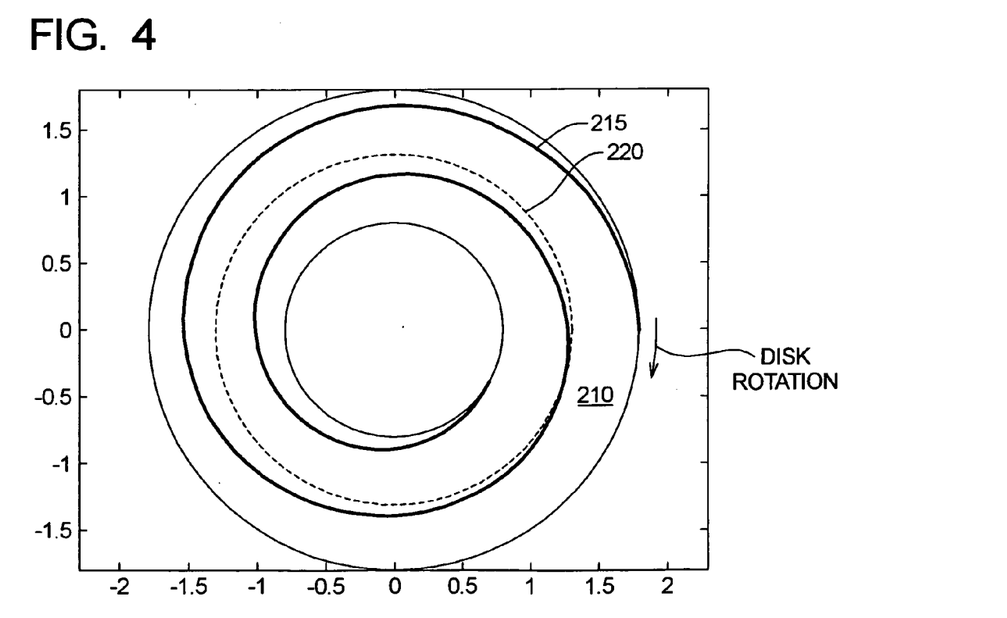
FIG. 4 is a diagrammatic representation of a disk surface having a spiral of servo information written thereon, along with a circular data storage track.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

Figure 5:
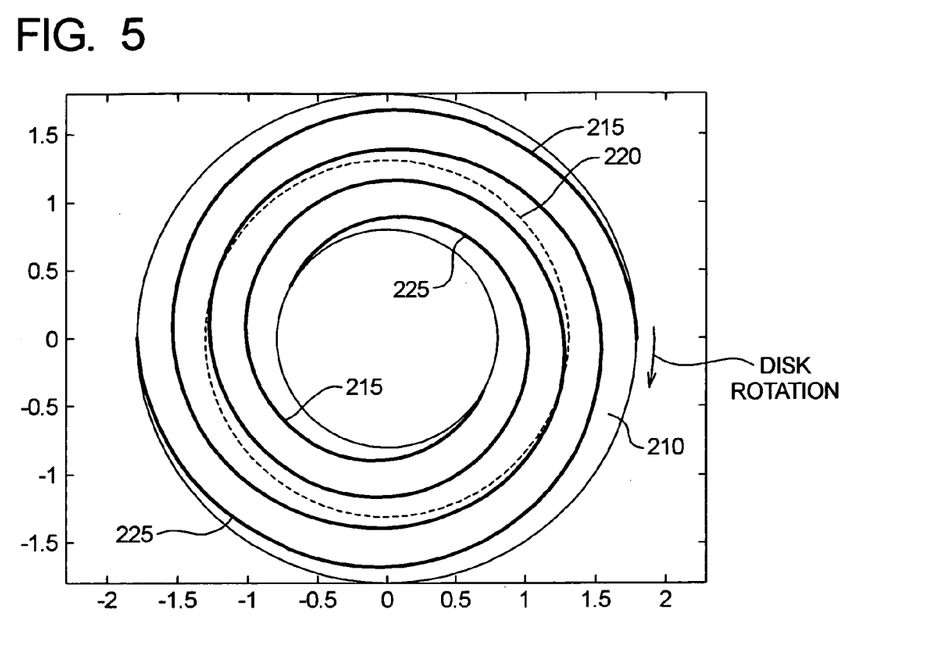
FIG. 5 is a diagrammatic representation of a disk surface having two spirals of servo information written thereon, along with a circular data storage track.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the number of spirals of servo information to be written, rather than the number of tracks.

Figure 6:
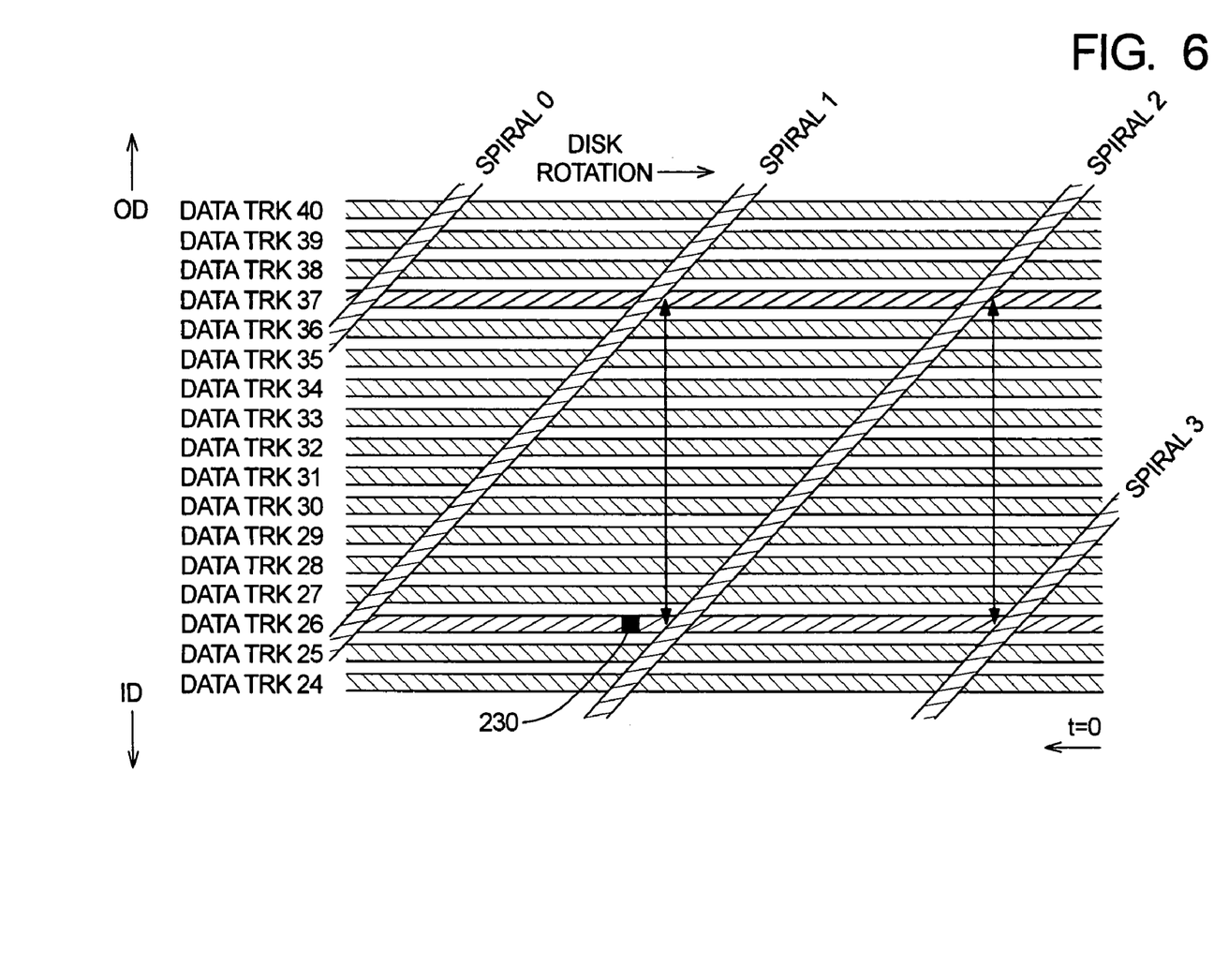
FIG. 6 is a diagrammatic representation of a magnified view of a portion of FIG. 5 showing additional spirals of servo information in a linear, instead of arcuate fashion, for ease of depiction.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24–40 are depicted in FIG. 6), the disk drive's read head 230 (also referred to herein as the reader) crosses over the spirals of servo information at intervals equal to the sample rate. Furthermore, the read head 230 crosses over the spirals of servo information at an angle. Additionally, the number of spirals of servo information that cross each of the tracks 220 is equivalent. For a given track 220, the spacing between adjacent spirals of servo information is approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

Figure 7:
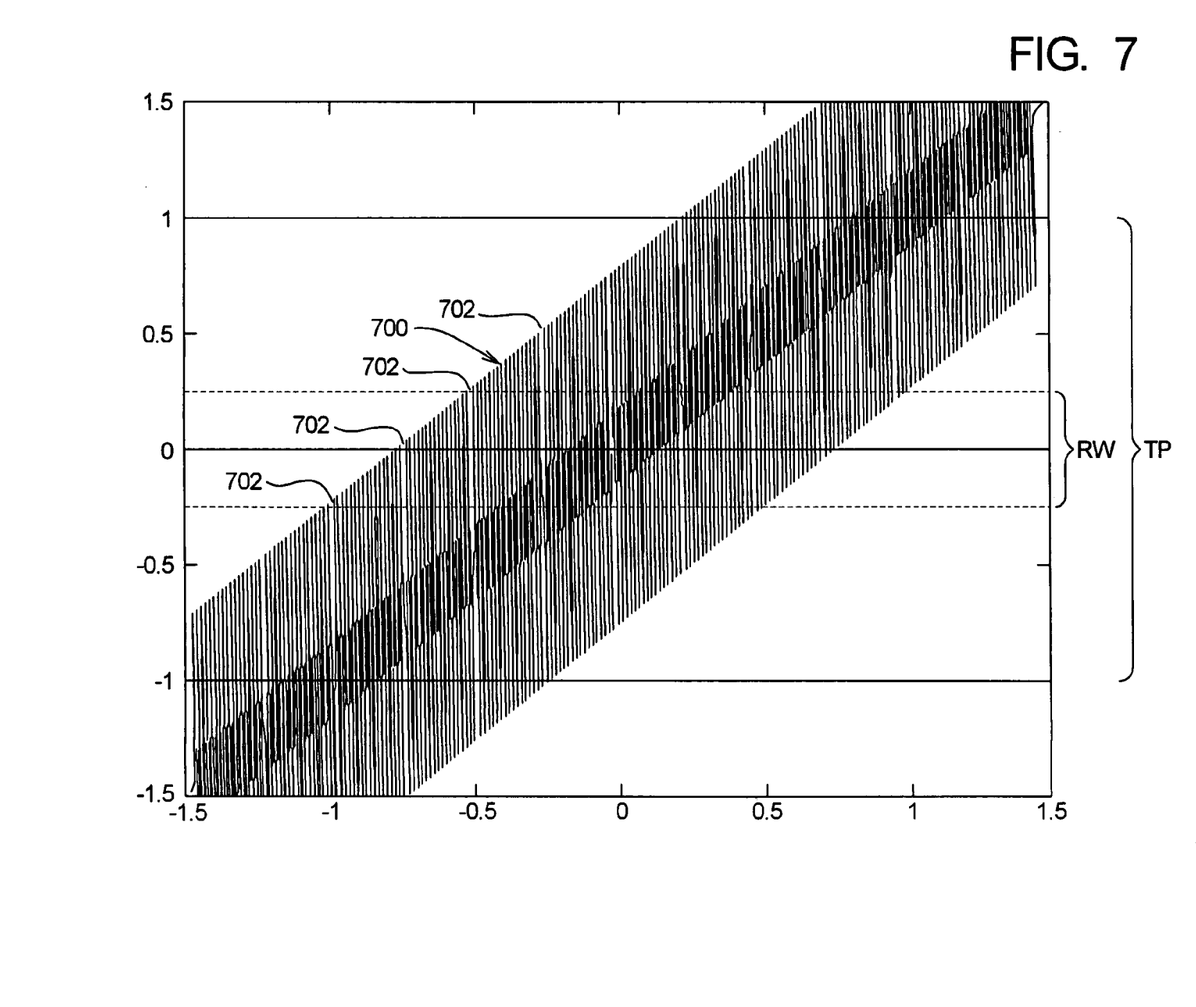
FIG. 7 is a diagrammatic representation of a magnified portion of one of the spirals of servo information shown in FIG. 6.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein. The sync marks 702 constitute phase shifts within the spiral pattern. In FIG. 7, the sync marks 702 are shown as regularly-spaced white areas within the spiral 700.

Figure 8:
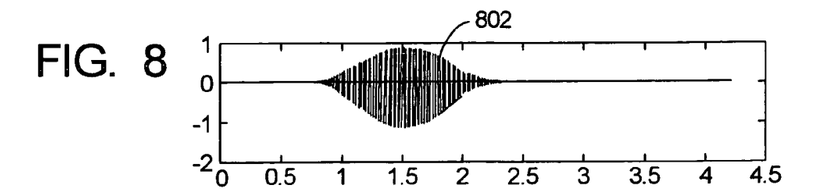
FIG. 8 is a diagrammatic representation of a read signal that is generated as the reader reads a portion of a spiral of servo information while the disk is spinning.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

Figure 9:
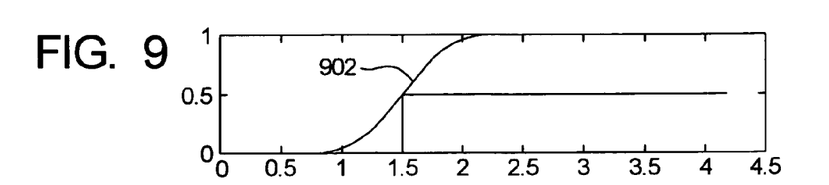
FIG. 9 is a diagrammatic representation of an integration curve in normalized units.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

Figure 10:
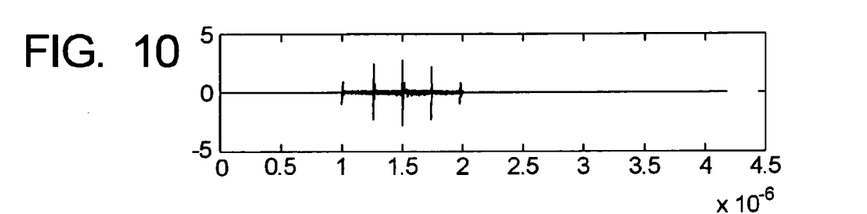
FIG. 10 is a diagrammatic representation illustrating five (5) sync marks in a read signal envelope.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

Figure 11:
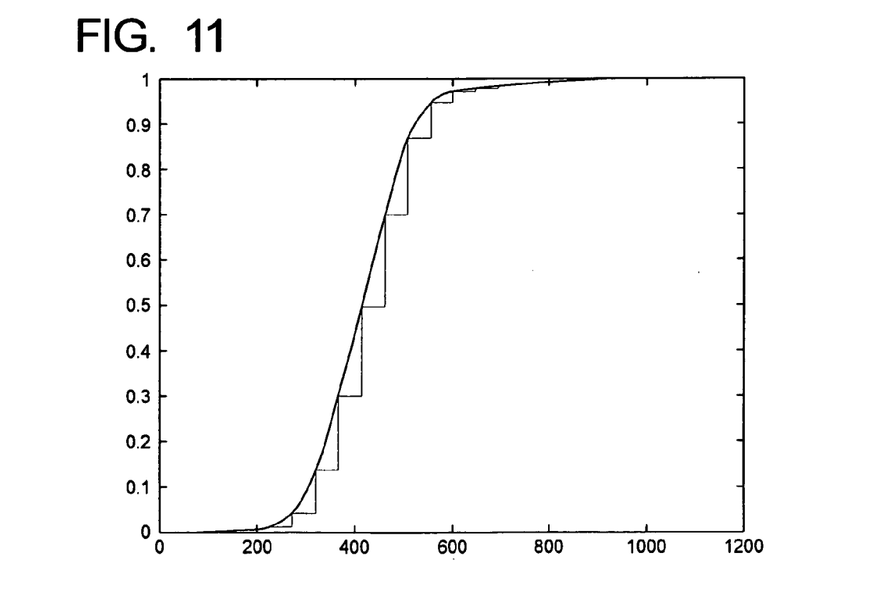
FIG. 11 is a diagrammatic representation of exemplary saved integrator values.

To determine the time at which the half integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync to sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

Figure 12:
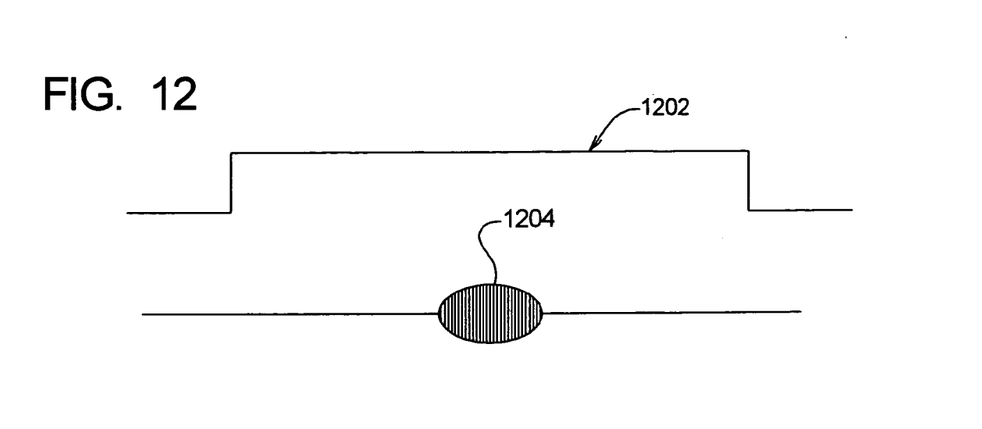
FIG. 12 is a schematic representation of an integration window and a read signal envelope, wherein the read signal envelope is centered in the integration window.

FIG. 12 is a schematic representation of an integration window (or gate) 1202 and a read signal envelope 1204. The integration window 1202 is opened around the expected position of the read signal envelope 1204. In FIG. 12, the read signal envelope 1204 is centered in the integration window 1202. In such case, the position error signal (PES) would be zero.

Figure 13A:
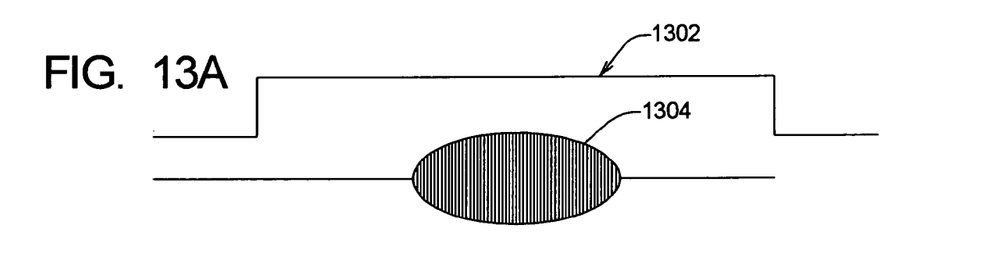
FIG. 13A is a schematic diagram illustrating a read signal envelope that is centered in an integration window.
Figure 13B:
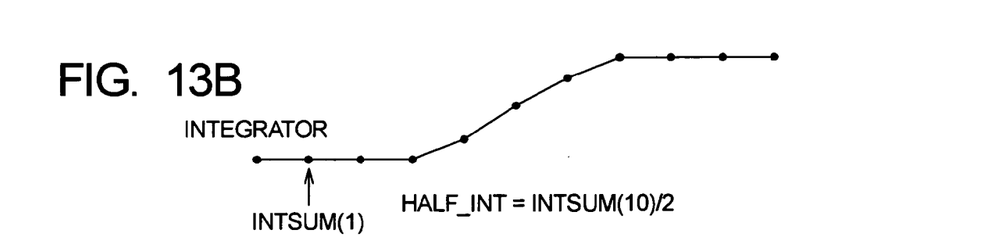
FIG. 13B is a schematic diagram illustrating a curve representing accumulated integration values across the integration window of FIG. 13A.

FIG. 13A is a schematic illustration of a read signal envelope 1304 that is centered in the integration window 1302 (i.e. the PES should be zero). FIG. 13B is a schematic illustration of a curve representing accumulated integration values across the integration window, wherein each dot represents accumulated integration values at a frame.

As described in U.S. patent application Ser. No. 10/859,062 filed Jun. 2, 2004, which is incorporated herein by reference, the assignee of the present invention has developed a technique of self-servo writing using spiral servo information. Specifically, with reference to FIG. 14, at a first station, a STW is used to write spirals of servo information onto the disk surface by moving a write head in a controlled (closed-loop) manner (e.g., at a constant velocity or along a velocity profile) across the disk surface while the disk is spinning (step 1410).

Figure 14:
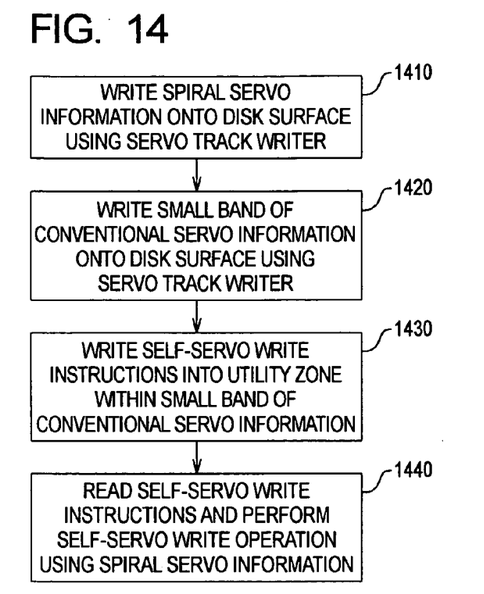
FIG. 14 is a flowchart illustrating a prior method of performing a self-servo write operation in a disk drive.

After all of the spirals have been written, a small band of conventional servo information (e.g., embedded servo information) is written onto the disk surface (e.g., near its inner diameter or the outer diameter) using the STW (step 1420). In one embodiment, a portion of the small band of conventional servo information is written at a radial location that overlaps with a radial location where spiral servo information has been written. In one embodiment, the number of servo spokes in the small band of conventional servo information corresponds to the number of spirals.

The small band of conventional servo information provides an absolute reference point (in both the radial and circumferential sense) on the disk surface. More specifically, conventional servo sectors in the small band of conventional servo information include both a track number (to provide a radial reference point) and a sector number (to provide a circumferential reference point). Final servo patterns may be written relative to this absolute reference point.

The small band of conventional servo information occupies less than 3% of the disk surface. More preferably, the small band of conventional servo information occupies less than 1% of the disk surface. Even more preferably, the small band of conventional servo information occupies less than 0.4% of the disk surface.

Next, the disk drive is moved out of the first station and into another station, so as to free-up the STW for other disk drives. At the second station, which includes a host connection, self-servo writing instructions and other information (e.g., drive firmware, self-test script, read channel parameter tables and defect management lists) are written into a utility zone, which is comprised of a portion (e.g., a few tracks) of the small band of conventional servo information (step 1430).

In one embodiment, the self-servo writing instructions and other information may be written to a temporary utility zone and then moved to a final utility zone as discussed in U.S. patent application Ser. No. 10/859,058 entitled "Method And Apparatus For Providing A Temporary Utility Zone In A Disk Drive" filed on Jun. 2, 2004 and incorporated herein by reference. U.S. Provisional Patent Application Ser. No. 60/475,097 filed Jun. 2, 2003 (from which the above-identified patent application claims priority) is also incorporated herein by reference.

It should be noted that, prior to writing any information into the utility zone, the read head comes ready on the small band of conventional servo information and the small band of conventional servo information (including the utility zone) is scanned for defects. Areas containing flaws are mapped out, so that they will not be used.

There are several techniques for bringing the read head to a ready position on the small band of servo information. One technique is described in U.S. Provisional Patent Application Ser. No. 60/475,039 entitled "BEMF Controlled Push Off/Acquire" filed Jun. 2, 2003, which is incorporated herein by reference.

Next, the disk drive is moved to a third station, where no host connection or other mechanical components need to access the drive. The disk drive is powered-on (e.g., with its normal supplies of +12V and +5V) and reads the self-servo writing information included in the utility zone, so as to undergo a self-servo write process using the spirals of servo information (step 1440). In one embodiment, the final servo pattern looks like the conventional servo pattern of FIG. 3.

It should be noted that, prior to reading the self-servo writing information, the read head comes ready (as in station 2) on the small band of servo information and locks to the absolute reference point (i.e., in time and position). Then, the drive code, manufacturing diagnostic code and self-test script (among which the self-servo writing information is included) are read.

Figure 15:
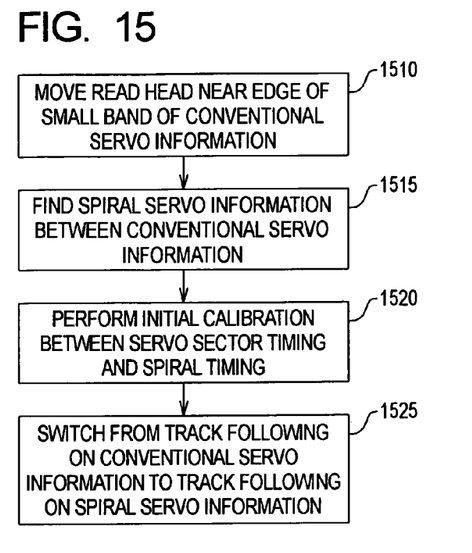
FIG. 15 is a flowchart used to describe a prior technique for moving from servoing on a small band of conventional servo information to servoing on spiral servo information in accordance with a prior technique.

FIG. 15 is used to describe a technique for moving from servoing on the small band of conventional servo patterns to servoing on the spiral servo information.

First, the read head (or, reference surface head, if servo information will be written on multiple disk surfaces) is moved near the edge of the small band of conventional servo information (e.g., to the edge of the utility zone) and a track following operation is performed on the conventional servo information (step 1510).

When the small band of conventional servo information was written onto the disk surface, preferably, a portion of the small band of conventional servo information was written at a radial location that overlapped with a radial location where spiral servo information was written. Therefore, spirals (e.g., the ends of spirals) should be located between adjacent servo sectors of the conventional servo information at some track within the small band of conventional servo sectors (preferably, close to its edge).

Next, the read head is used to find spiral servo information between conventional servo information (step 1515). Once one spiral of servo information has been found, the other spirals of servo information can be found because the spirals are encountered at known time intervals (e.g., constant intervals at a radius). As is well known to those skilled in the art, conventional servo sectors are also encountered at known time intervals while reading a particular track.

An initial calibration is performed of servo sector timing to spiral timing (step 1520). Finally, the disk drive switches from track following on the conventional servo information to track following on the spiral servo information (step 1525).

Track following may be performed in conjunction with some of the techniques described in U.S. patent application Ser. No. 10/858,847 entitled "Method And Apparatus For Providing Multi-Point Position Demodulation Of A Read Head When Using Spiral-Written Servo Information" filed on Jun. 2, 2004 and incorporated herein by reference. U.S. Provisional Patent Application Ser. No. 60/475,049 entitled "Multi-Point Position Demodulation" filed Jun. 2, 2003 (from which the above-identified patent application claims priority) is also incorporated herein by reference.

Furthermore, track following may be performed in conjunction with some of the techniques described in U.S. patent application Ser. No. 10/858,839 entitled "Method And Apparatus For Determining A Transducer's Reference Position In A Disk Drive Having A Disk Surface With Spiral Servo Information Written Thereon" filed on Jun. 2, 2004 and incorporated herein by reference. U.S. Provisional Patent Application Ser. No. 60/475,098 entitled "Virtual Integration Window For Spiral Position Demod" filed Jun. 2, 2003 (from which the above-identified patent application claims priority) is also incorporated herein by reference.

Once track following on the spiral servo information, the initial timing calibration value is used to indicate the location of the first portion of the self-servo written information. A number of revolutions are also spent at the first location to establish an initial timing reference of a disk locked clock.

It should be understood that there are other techniques for moving the read head from a position where it is not track following on spiral servo information to a position where it is track following on spiral servo information. One such technique is described in U.S. patent application Ser. No. 10/858,846 entitled "Method And Apparatus For Acquiring Onto Spiral Servo Information Written On A Disk Surface Of A Disk Drive" filed on even date herewith and incorporated herein by reference. U.S. Provisional Patent Application Ser. No. 60/475,051 entitled "Asynchronous Pushoff And Acquire Onto Spiral Written Servo Format" filed Jun. 2, 2003 (from which the above-identified application claims priority) is also incorporated herein by reference.

Because the spiral servo information is used to write final servo patterns onto the disk surface, it is beneficial to account for the repeatable runout in the spiral servo information before writing the final servo patterns. One technique for accounting for repeatable runout is described in U.S. patent application Ser. No. 10/859,068 entitled "Method And Apparatus For Improving Spiral-Based Position Correction System Stability Via Kernel Frequency Component Modification" filed on Jun. 2, 2004 and incorporated by reference. The above-identified patent application claims priority from both U.S. Provisional Patent Application Ser. No. 60/475,114 filed Jun. 2, 2003 entitled "Methods To Improve Spiral-Based Position Correction System Stability Via Kernel Frequency Component Modification" filed Jun. 2, 2003 and U.S. Provisional Patent Application Ser. No. 60/475,129 entitled "Integrating Spiral Position Correction System" filed Jun. 2, 2003, both of which are incorporated herein by reference.

As described in the above-identified patent applications, position correction values (to account for repeatable runout) are continuously modified, via integration, while tracking, as opposed to recalculating the correction values at every track. This is accomplished by taking advantage of the high degree of correlation in the repetitive runout in neighboring tracks and, therefore, less processing time is used. Accordingly, once the read head is track following on spiral servo information, initial values for position correction values may be obtained by gathering data over a few revolutions of the disk surface. Furthermore, in one embodiment, data is also gathered (over the few revolutions) to characterize the servo system (plant). Calculation, application and verification of the characterization is performed for the track over which the read head is track following.

Once the repeatable runout has been accounted for, final servo information is written onto the disk surface by the disk drive's write head. In order to move from to a new location while servoing on the spiral servo information, an incremental seek operation, equivalent to one spiral servo pattern step, is performed.

One technique for performing an incremental seek operation is described in U.S. patent application Ser. No. 10/858, 830 entitled "Method And Apparatus For Performing Seek Operations In A Disk Drive Having A Disk Surface With Spiral Servo Information Written Thereon" filed on Jun. 2, 2004 and incorporated herein by reference. The above-identified patent application claims priority from both U.S. Provisional Patent Application Ser. No. 60/475,112 filed entitled "Incremental Seeking On Spiral Written Servo Format" filed Jun. 2, 2003 and U.S. Provisional Patent Application Ser. No. 60/475,127 entitled "Constant Acceleration Seek Algorithm For Spiral-Based Positioning System" filed Jun. 2, 2003, both of which are incorporated herein by reference.

While the incremental seek operation is being performed, track ID values and the final servo pattern for the next track are calculated and loaded into a write buffer. Timing corrections are applied to the disk-locked clock, since spiral timing has changed due to movement in a radial direction. Then, the track ID values and the final servo pattern are written to the disk surface (or disk surfaces), in the same manner that customer data is written (e.g., using the disk drive's write head).

Position correction values are updated, while track following, using spiral servo information from the new radial location. Because the repeatable runout is highly correlated from track-to-track, as described above, it is not necessary to gather completely new position correction values while track following for many revolutions. (However, it should be understood that, in some embodiments, this can be done.)

An incremental seek is performed again to move to the following radial location and the updated position correction values are used to reduce repeatable runout before writing the final servo information at this location. The above process is then repeated until final servo patterns have been written over substantially all of the disk surface (or disk surfaces). Once the disk drive has been formatted with the final servo patterns, it will appear as a "normal" drive, which is ready for standard self-test processes.

It should be noted that in addition to compensating for repeatable runout, compensation may also be provided for repeatable timing errors, so as to reduce timing errors in the final servo pattern. One method of compensating for repeatable timing errors is discussed in U.S. Provisional Patent Application Ser. No. 60/475,115 entitled "Integrating Spiral Timing Correction System" filed Jun. 2, 2003 and incorporated herein by reference.

When servoing on spiral servo patterns to write final servo patterns, the time of writing may coincide with the time of reading spiral servo information. Because a transducer cannot read and write at the same time, there is a conflict. This is referred to as a "collision" of the spiral servo information with the final servo pattern.

Collisions occur because, as the head moves from track to track, the spirals shift in time relative to the final pattern that is being written. Collisions occur even though the write head and the read head are physically offset.

Figure 16:
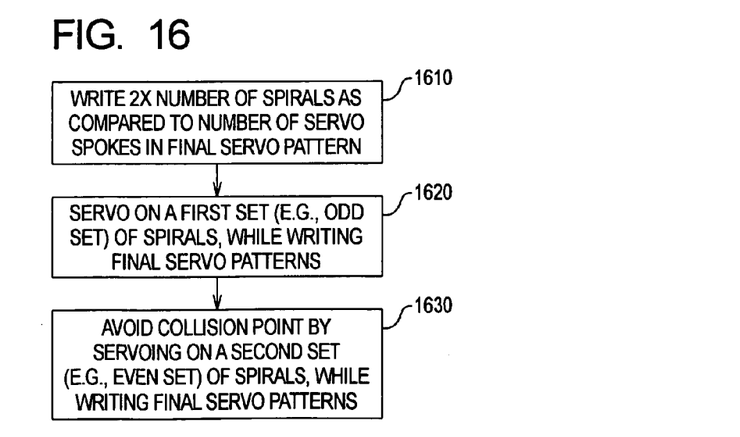
FIG. 16 is used to describe a prior technique for avoiding collisions, while self-servo writing; and, FIG. 17 illustrates an embodiment of the present invention.

FIG. 16 is used to describe a technique for avoiding collisions. In this embodiment, two times the number of spirals of servo information are written as compared to the number of servo spokes in the final servo pattern (step 1610). For example, if the final servo pattern was to have 192 servo spokes, then 384 spirals would be written.

The spirals are grouped into two sets, wherein adjacent spirals are in different sets. Accordingly, if the spirals were numbered consecutively around the disk surface, a first set of spirals would comprise odd-numbered spirals and a second set of spirals would comprise even-numbered spirals.

While writing final servo patterns onto the disk surface, the read head servos on one of the two sets of spirals. For example, the read head servos on the odd set of spirals (step 1620). In this embodiment, the sample rate will be equal to half of the number of spirals written onto the disk surface (e.g., if using the above example, the sample rate will be 192).

Before a known collision point, the read head switches to servoing on the other set of spirals, so as to avoid a collision. In this example, the read head will switch to servo on the even set of spirals (step 1630). Preferably, the switch will occur halfway between the known collision points.

Switches are made, back and forth, to avoid collisions, until all of the final servo patterns are written to the disk surface. Collision points can be calculated by those skilled in the art.

U.S. Pat. No. 6,714,376 to Brunnett et al. entitled "Partial Servo Write Fill In" describes a somewhat similar technique. U.S. Pat. No. 6,714,376 is assigned to the assignee of the present invention and is incorporated herein by reference.

In one embodiment, even though the read head is positioned based upon a servo sample rate that is equal to half of the number of spirals written onto the disk surface (e.g., it will be servoing on the first set of spirals), position error signals are collected for all spirals in a revolution. Accordingly, additional data is collected for performing repeatable runout compensation on the second set of spirals, without requiring additional revolutions of the disk surface and, hence, without requiring additional time.

After switching between the two sets of spirals, transients may be present in both the position correction values and the timing correction values. Methods for reducing such transients are discussed in U.S. Provisional Patent Application Ser. No. 60/475,043 entitled "Methods To Reduce Correction Value Transients At Spiral Switch Points" filed Jun. 2, 2003, which is incorporated by reference.

In another embodiment of avoiding collisions, the same number of spirals of servo information are written as compared to the number of final servo spokes. In this embodiment, the self-servo write process alternate between reading and writing at every other spiral. Accordingly, two revolutions of the disk would be required before the final servo information was completely written at a radial location (e.g., the read head would not incrementally seek to the next radial location for two revolutions).

Yet another embodiment includes using a ratio of M spirals per revolution to N servo spokes per revolution. In this embodiment, a recognition is made that there are instances where spiral servo information cannot be read while writing final servo information. In choosing M and N, such instances are reduced to a tolerable point. This embodiment may be especially useful when there is a very large runout between the spiral servo information and the final servo information (as may be the case when the disk becomes mis-centered after the spiral servo information has been written, but before the final servo patterns are written, e.g., disk slip). This embodiment may also be useful when the servo processor bandwidth is not capable of running at twice the sample rate of a standard servo system. In one embodiment, M is 2 and N is 1. In another embodiment, M is 8 and N is 7.

In order to write radially-coherent final servo patterns, timing information from the spiral servo pattern is used. The spiral servo pattern is written using a servo track writer in conjunction with a clock head and a phased locked loop system (in a manner similar writing conventional servo patterns). During the self-servo write process, spiral timing information is extracted and is input to a disk-locked clock. The disk-locked clock is a firmware-controlled phase-locked loop.

The input to the disk-locked clock is the sampling phase of the read signal envelope relative to an ADC clock in the channel. The firmware calculates a frequency correction to the channel clock VCO to null the error and to maintain radial coherence (e.g., to less than a nanosecond). An exact integer number of sample clocks are maintained from spiral-to-spiral in order to write coherent patterns from track-to-track while self-servo writing. This function is performed with a counter clocked from the disk-locked clock and gated with the detection of the sync mark found in the spiral pattern during the demodulation process. The firmware includes this counter in the control of the phase-locked loop to maintain a proper spacing of final pattern spoke-to-spoke timing, as well as writing a radially coherent servo pattern.

In one embodiment, spiral patterns are written at a relatively low velocity, so as to reduce acceleration and deceleration overshoots. In one embodiment, the spiral patterns are written at a velocity of about 5 inches per second. In another embodiment, the spiral patterns are written at a velocity of about 6 inches per second. In another embodiment, the spiral patterns are written at a velocity ranging between 5 inches per second and 6 inches per second. In one embodiment, the sync-to-sync spacing is equal to ¼ of a track of the final servo pattern.

There are certain instances in which spirals of servo information are significantly misplaced when the spirals are written using the STW. Misplacement may be due to a number of reasons including disk-slip, push-pin compression, vibrational disturbances, and the like. Accordingly, when servoing on spiral information in conjunction with writing final servo patterns, it is important to determine when significantly misplaced spirals are encountered.

In one prior technique, accumulated integration values across integration windows are monitored. If an accumulated integration value for an integration window is less than a predetermined threshold, an assumption is made that a significantly misplaced spiral has been encountered or that a timing error exists. That is, it is assumed that the accumulated integration value is less than the predetermined threshold because the read signal envelope is partially or completely outside of the integration window.

In such case, the half-integrator value (described above) is not used to re-position the transducer. Instead, the position error signal associated with such half-integrator value is ignored. A counter may be used to count the number of consecutive integration windows that have accumulated integration values that are less than the predetermined threshold. If more than a predetermined number of consecutive integration windows have accumulated integration values that are less than the predetermined threshold (e.g., more than 15 in a row), the drive is failed and an off-track error is recorded. The drive may then be sent back through a reprocessing line, where the STW may be used to rewrite spirals of servo information onto the disk surface.

It should be noted that instead of being a fixed value, the predetermined threshold may comprise a rolling average of accumulated integration values over a pre-selected number of integration windows. It should also be noted that half integrator values, instead of the accumulated integration values, may be compared to the predetermined threshold.

The inventors of the present invention have studied disk drives that have been failed due to having more than a predetermined number of consecutive integration windows with accumulated integration values that are less than the predetermined threshold. The inventors found that some of such drives included spirals of servo information that were properly-written on the disk surface using the STW. Therefore, such drives may have been improperly diagnosed as suffering from off-track errors.

Accordingly, the drives may be improperly designated for reprocessing (e.g., rewriting of spirals of servo information using the STW), which increases overall manufacturing times (and costs) and reduced overall drive yields. Furthermore, energy spent on trying to correct the problem may be misplaced.

Therefore, it would be beneficial to develop a technique for distinguishing between drives having accumulated integration values that are lower than a predetermined threshold due to off-track errors (due to poor spiral placement during servo track writing) and drives having accumulated integration values that are lower than a predetermined threshold due to other reasons.

SUMMARY OF THE INVENTION

The present invention is designed to meet some or all of the aforementioned, and other, needs.

The present invention is directed to a method and apparatus for detecting and monitoring a bi-state head when self-servowriting a disk drive using spiral servo information. In one embodiment, an integration window is opened about an expected time that a read head will read spiral servo information. An integration value associated with the integration window is determined. Next, a determination is made as to whether the integration value is less than a predetermined low amplitude limit. If it is, a comparison is made between a location of a maximum sync frame of a read signal envelope in the integration window and the center of the integration window. The read head is identified as a bi-state head if the location of the maximum sync frame is greater than a predetermined off-center limit relative to the location of the center of the integration window.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The inventors of the present invention have recognized that, during the self-servowriting process, accumulated integration values over an integration window may be less than a predetermined threshold for reasons different than misplacement of spirals of servo information written using the STW. Without wishing to be bound by any theory, the inventors believe that write-induced instabilities in disk drive's read head may cause accumulated integration values (and, hence, half integrator values) to sharply drop (or sharply increase). In some instances, for example, the inventors have determined that the half-integrator value may drop by 50%.

A read head having such characteristics is referred to as a bi-state head. The present invention is directed to a method and apparatus for detecting and monitoring a bi-state head when self-servowriting a disk drive using spiral servo information.

Figure 17:
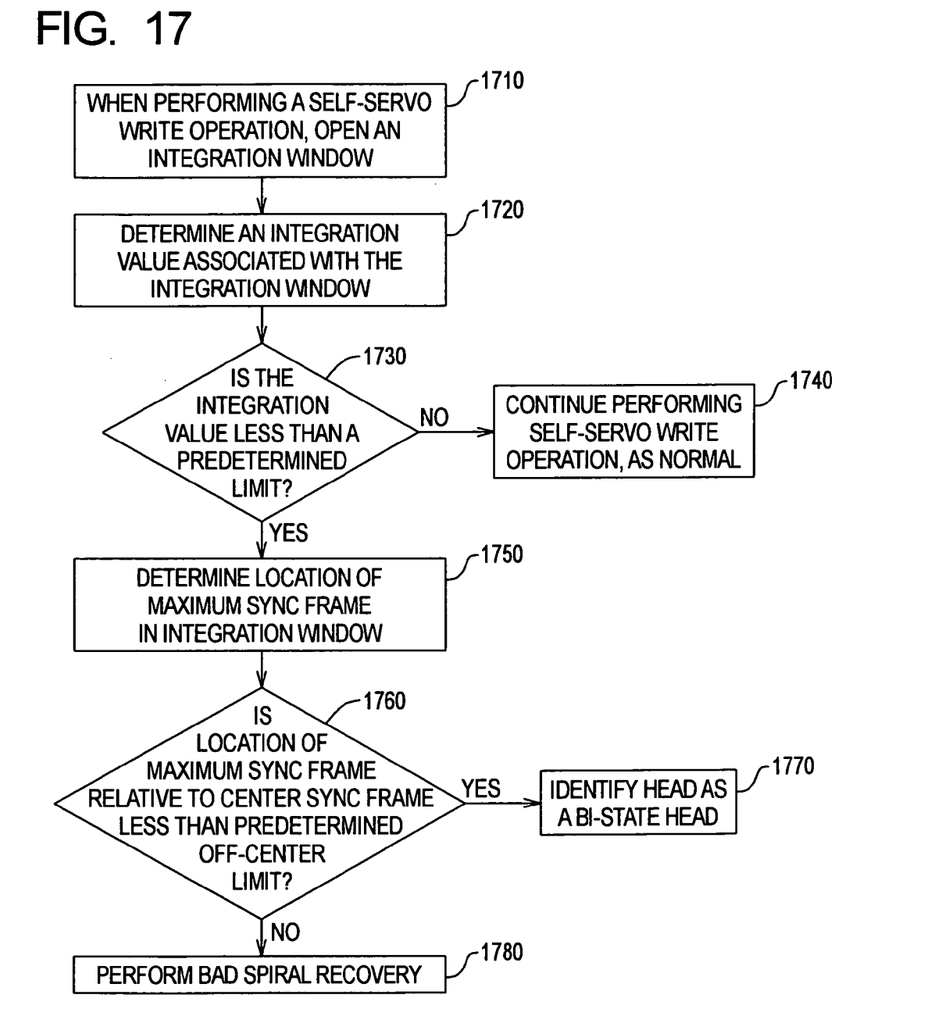

One embodiment of the present invention is shown in FIG. 17. As described in the background of the invention section of the present application, a self-servo write operation includes reading spiral servo information from a disk surface using a read head and writing final servo patterns onto the disk surface using a write head. The final servo patterns, in one embodiment, may look like the servo patterns shown in FIG. 3.

When performing the self-servo write operation, an integration window is opened at an expected time that the read head will read spiral servo information (step 1710). In response to reading the spiral servo information, the read head will generate a read signal envelope.

Next, an integration is performed over the integration window, for example, on a frame-by-frame basis, and an accumulated integration value is obtained. This value may be divided by two to obtain the half integrator value or some other number n to obtain the $1/n^{th}$ integrator value. In any event, an integration value associated with the integration window is determined (step 1720), wherein the integration value may be the accumulated integration value, the half integrator value, the $1/n^{th}$ integrator value or the like.

Next, a comparison is made between the integration value associated with the integration window and a predetermined low-amplitude limit (step 1730). If the integration value associated with the integration window is not less than the predetermined low-amplitude limit, the self-servo write operation is continued, as normal (step 1740).

However, if the integration value associated with the integration window is less than the predetermined low-amplitude limit, a determination is made as to the location of the frame in which the largest portion of the read signal envelope is contained (step 1750). That is, a determination is made as to the frame containing the maximum sync mark. This is known as the maximum sync frame.

As mentioned above, the integration window includes a plurality of sync frames, one of which is a center sync frame (if the integration window as an odd number of frames). Next, the location of the maximum sync frame is compared to the location of a center sync frame (or frame near the center of the integration window if there are an even number of frames) (step 1760). Alternatively, the location of the maximum sync mark can be compared to the location of the center of the integration window.

If the location of the maximum sync frame relative to the center sync frame is greater than a predetermined off-center limit, then a bad spiral recovery operation is performed (step 1780). In the bad spiral recovery operation, for example, the drive may be sent through a reprocessing line in which the STW be used to rewrite spirals of servo information onto one or more disk surfaces of the disk drive.

In contrast, if the location of the maximum sync frame relative to the center sync frame is less than a predetermined off-center limit, then the read head is identified as a bi-state head and the low-amplitude is presumed to be due to the bi-state head (step 1770). In such case, the drive would not necessarily be sent through the same reprocessing line used for bad spiral recovery. In some cases, for example, the drives can be failed and thrown away, so that valuable STW time is not used.

Furthermore, bi-state identification can be used as feedback to head suppliers, so that an expeditious solution can be obtained when a sufficient number of read heads or particular types of read heads are identified as bi-state heads. Bi-state head identification may also be used as a screen to improve disk drive reliability. In one embodiment, identification of a bi-state head is stored on the disk surface of the disk drive.

It should be understood that the bi-state head may sometimes experience a spike, instead of a drop, in amplitude. Accordingly, in one embodiment, instead of determining whether the integration value associated with integration window is less than a predetermined limit, a determination is made as to whether the integration value associated with integration window is outside of a predetermined range.

The present invention may be used in conjunction with some of the techniques described in U.S. patent application Ser. No. 10/858,847 entitled "Method And Apparatus For Providing Multi-Point Position Demodulation Of A Read Head When Using Spiral-Written Servo Information" filed on Jun. 2, 2004 and incorporated herein by reference. U.S. Provisional Patent Application Ser. No. 60/475,049 entitled "Multi-Point Position Demodulation" filed Jun. 2, 2003 (from which the above-identified patent application claims priority) is also incorporated herein by reference.

Furthermore, the present invention may also be used in conjunction with some of the techniques described in U.S. patent application Ser. No. 10/858,839 entitled "Method And Apparatus For Determining A Transducer's Reference Position In A Disk Drive Having A Disk Surface With Spiral Servo Information Written Thereon" filed on Jun. 2, 2004 and incorporated herein by reference. U.S. Provisional Patent Application Ser. No. 60/475,098 entitled "Virtual Integration Window For Spiral Position Demod" filed Jun. 2, 2003 (from which the above-identified patent application claims priority) is also incorporated herein by reference.

It should be understood that aspects of the present invention are not limited by the manner in which spiral servo information is written onto the disk surface. Accordingly, the present invention may be used in conjunction with spiral servo information that has been placed on a disk surface using techniques associated with printed media or patterned media processes, among other processes.

In one embodiment, the integration window includes 15 frames. In another embodiment, the integration window includes 31 frames.

In one embodiment, the predetermined low amplitude limit is about 50% of the integration value from the prior integration window. In another embodiment, the predetermined limit is about 50% of a running average of a pre-selected number of prior integration values.

In one embodiment, the predetermined range is greater than about 50% of the integration value from the prior integration window, but less than about 200% of the integration value from the prior integration window. In yet another embodiment, the predetermined range is greater than about 50% of a running average of a pre-selected number of prior integration values and less than about 200% of the running average of the pre-selected number of prior integration values.

In one embodiment, the pre-selected number is less than 192. In another embodiment, the pre-selected number is less than or equal to 25. In yet another embodiment, the pre-selected number is less than or equal to 10. In yet a further embodiment, the pre-selected number is less than or equal to 4.

In one embodiment, the predetermined off-center limit is expressed in frames. In one embodiment, the predetermined off-center limit is about $1/8^{th}$ of a frame. In another embodiment, the predetermined off-center limit is about $1/4^{th}$ of a frame. In yet another embodiment, the predetermined off-center limit is about ½ of a frame. In yet a further embodiment, the predetermined off-center limit is about 1 frame. In another embodiment, the predetermined off-center limit is about 2 frames.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
    providing a disk surface having spiral servo information written thereon;
    performing a self-servo write operation, wherein the self-servo write operation includes reading spiral servo information from the disk surface using a read head and writing final servo patterns onto the disk surface using a write head;
    opening an integration window at an expected time that the read head will read spiral servo information, wherein the read head generates a read signal envelope;
    determining an integration value associated with the integration window;
    determining whether the integration value is less than a predetermined low amplitude limit;
    if the integration value is less than the predetermined low amplitude limit, then determining a location of a maximum sync frame of the read signal envelope in the integration window.

2. The method of claim 1 wherein the location of the maximum sync frame is compared to a location of a center frame in the integration window.

3. The method of claim 2 wherein the read head is identified as a bi-state head if the location of the maximum sync frame is greater than a predetermined off-center limit relative to the location of the center frame in the integration window.

4. The method of claim 3 wherein the disk surface is located in a disk drive and information relating to the identification of the read head as a bi-state head is stored in the disk drive.

5. The method of claim 4 wherein information relating to the identification of the read head as a bi-state head is stored on the disk surface of the disk drive.

6. The method of claim 2 wherein:
    if the location of the maximum sync frame is less than the predetermined off-center limit relative to the location of the center frame in the integration window, a bad spiral recovery procedure is performed.

7. The method of claim 1 wherein the integration window includes 15 frames.

8. The method of claim 1 wherein the integration window includes 31 frames.

9. The method of claim 1 wherein:
if the integration value is greater than the predetermined low amplitude limit, then continuing to perform the self-servo operation.

10. A method comprising the steps of:
providing a disk surface having spiral servo information written thereon;
performing a self-servo write operation, wherein the self-servo write operation includes reading spiral servo information from the disk surface using a read head and writing final servo patterns onto the disk surface using a write head;
opening an integration window at an expected time that the read head will read spiral servo information, wherein the read head generates a read signal envelope;
determining an integration value associated with the integration window;
determining whether the integration value is outside of a predetermined range;
if the integration value is outside of the predetermined range, then determining a location of a maximum sync frame of the read signal envelope in the integration window.

11. The method of claim 10 wherein the location of the maximum sync frame is compared to a location of a frame near the center of the integration window.

12. The method of claim 11 wherein the read head is identified as a bi-state head if the location of the maximum sync frame is greater than a predetermined off-center limit relative to the location of the frame near the center of the integration window.

13. The method of claim 12 wherein the disk surface is located in the disk drive and information relating to the identification of the read head as a bi-state head is stored in the disk drive.

14. The method of claim 13 wherein information relating to the identification of the read head as a bi-state head is stored on the disk surface of the disk drive.

15. The method of claim 11 wherein:
if the location of the maximum sync frame is less than the predetermined off-center limit relative to the location of the center frame in the integration window, a bad spiral recovery procedure is performed.

16. The method of claim 10 wherein the integration window is at least 15 frames in length.

17. The method of claim 10 wherein the integration window is at least 31 frames in length.

18. The method of claim 10 wherein:
if the integration value is greater than the predetermined low amplitude limit, then continuing to perform the self servo write operation.

* * * * *